United States Patent [19]

Conway, Jr.

[11] 4,008,874
[45] Feb. 22, 1977

[54] UMBRELLA SUPPORTING BRACKET FOR MOTORIZED CARTS

[76] Inventor: John W. Conway, Jr., 15035 Westholm Court, Silver Spring, Md. 20906

[22] Filed: Oct. 23, 1974

[21] Appl. No.: 517,392

[52] U.S. Cl. .......................... 248/534; 280/DIG. 6
[51] Int. Cl.² ....................................... A01K 97/10
[58] Field of Search ................. 248/38, 40, 41, 42, 248/43, 226 B, 257, 534, 538, 539, 535; 135/7; 297/184; 280/DIG. 5, DIG. 6; 224/29 B

[56] References Cited

UNITED STATES PATENTS

| 336,363 | 2/1886 | Ward | 248/40 |
|---|---|---|---|
| 460,207 | 9/1891 | Lazarus | 297/184 |
| 462,265 | 11/1891 | Mason | 248/40 |
| 840,241 | 1/1907 | Nootbaar | 248/40 |
| 840,406 | 1/1907 | Williams | 248/41 |
| 902,459 | 10/1908 | Williams et al. | 248/40 |
| 2,191,075 | 2/1940 | Hogan | 248/42 |
| 2,738,152 | 3/1956 | Blackmore | 248/226 B |
| 2,822,969 | 2/1958 | Cooper | 280/DIG. 6 |
| 2,844,209 | 7/1958 | Brunderman | 280/DIG. 5 |

OTHER PUBLICATIONS

"Time Out" 7-16-62, Washington Daily News.

Primary Examiner—Robert A. Hafer
Attorney, Agent, or Firm—Frank P. Cyr

[57] ABSTRACT

An attachment for a motorized cart comprising an adjustable bracket which may be mounted on suitable support arms which extend rearwardly of the cart. The bracket is adapted to retain an umbrella or like canopy in adjusted position so as to extend over the occupants of the cart and also over a storage area which is provided rearwardly of the seating area for the occupants of the cart.

4 Claims, 5 Drawing Figures

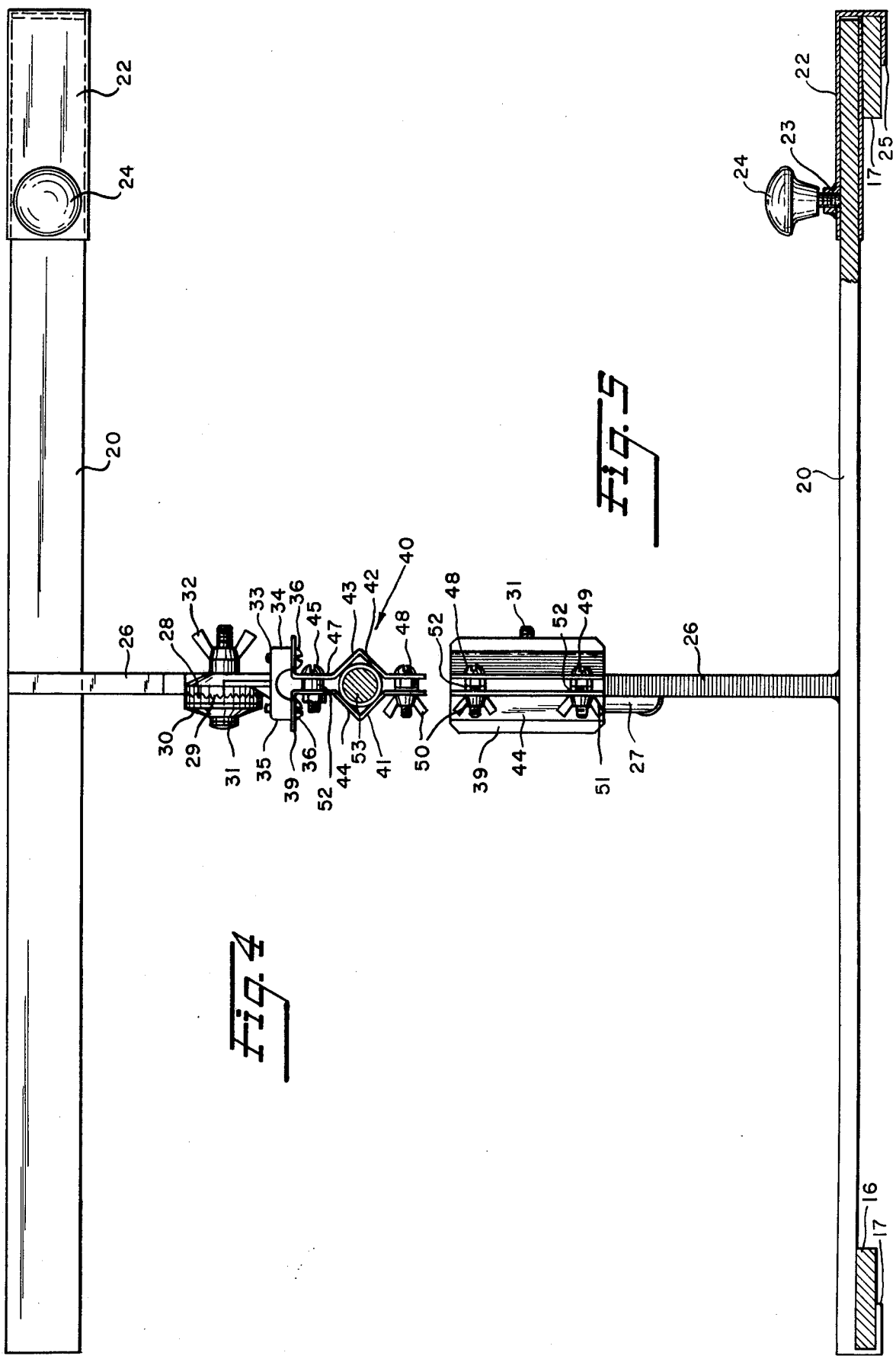

UMBRELLA SUPPORTING BRACKET FOR MOTORIZED CARTS

BACKGROUND OF THE INVENTION

Motorized carts for transporting occupants thereof have become very popular in recent years and such carts are employed primarily by golfers although such carts have also been employed by policemen in the performance of their duties, invalid persons unable to walk any great distance, etc. Usually such carts are so constructed as to enable two persons to occupy the same and a seating area is provided for the occupants of the cart and provided rearwardly of the seating area is a storage area which when the cart is used by a golfer, receives and retains the golfing equipment such as the bag and clubs of the player.

At present, some cart manufacturers provide a motorized cart with a canopy or covering which extends over the occupants of the cart so as to protect them from the elements. However, such canopy is mounted in a fixed position on the cart and the cart framing must be modified to support the canopy which adds materially to the costs thereof and also, such canopy does not extend over the storage area aforesaid. Other motorized carts which are manufactured without the aforesaid canopy usually consists of an open structure which provides a seating area for the occupants and a storage area located immediately rearward of the seating area.

Both of the aforementioned makes of motorized carts have certain advantages and disadvantages. For instance, the cart having a factory-installed canopy may not be desired when the occupants of the cart wish to be exposed to the sun, whereas the cart without a permanently installed canopy is not desirable during inclement weather.

With the above in mind it is the primary object of the invention to provide an attachment for supporting a canopy such as an umbrella or the like which may be quickly secured to the existing frame structure of an open type cart whereby the occupants of the cart as well as the objects in the storage area may be protected from the elements.

Another object of the invention is to provide an adjustable bracket supporting structure which will permit the same to be mounted on motorized carts having differing widths supporting surfaces for the aforesaid bracket.

Another object of the invention is to provide a two-part clamp structure for securing the handle portion of a canopy such as an umbrella.

Another object of the invention is to mount a two-part clamp structure onto an adjustable connector means which will permit for the umbrella to be tilted and secured in adjusted position so that the same will effectively protect the occupants of the cart as well as the objects in the storage area of the cart.

Another object of the invention is to centrally position the bracket supporting arm so that the same will normally extend between the seat backs of the cart thus eliminating any interference of the bracket supporting arm with the occupants of the carts.

My invention consists in the construction, arrangement and combination of the various parts of the device, whereby the objects contemplated are attained as hereinafter more fully set forth, specifically pointed out in my claims, and illustrated in the accompanying drawings in which:

DESCRIPTION OF THE DRAWINGS

FIG. 4 is a top plan view showing the manner in which the handle of an umbrella is retained within the confines of the two-part clamp, and, FIG. 5 is a side view of the attachment shown in FIG. 4 of the drawings.

DESCRIPTION OF THE PREFERRED EMBODIMENTS

Before undertaking a detailed description of the structure forming my invention, it should be pointed out that while the drawings show a typical type motorized cart usually employed by golfers, the same is not to be construed as being limited to carts for such use only as it is known that similar carts are employed by policemen, mailmen, handicapped persons, etc.

Figure 1:
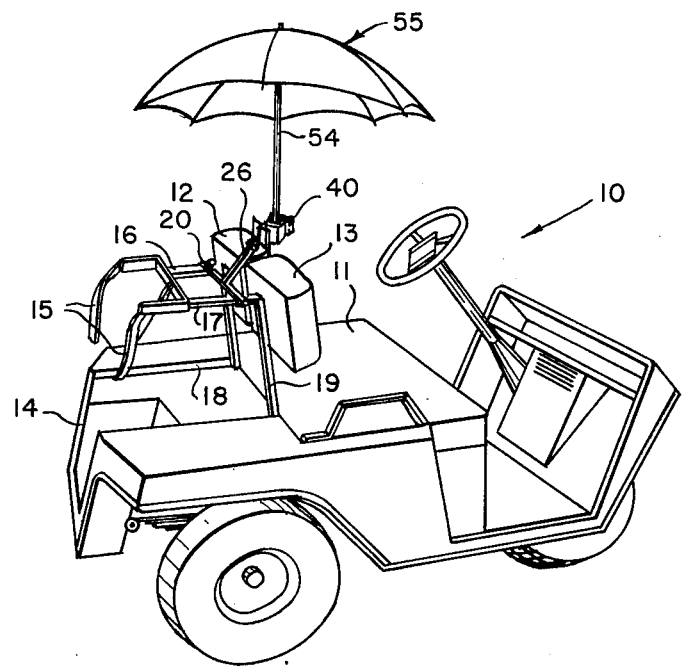
FIG. 1 is a perspective view of a motorized golf cart showing the canopy supporting bracket mounted in position on the existing structure of a conventional open type cart.
Figures 2, 3:
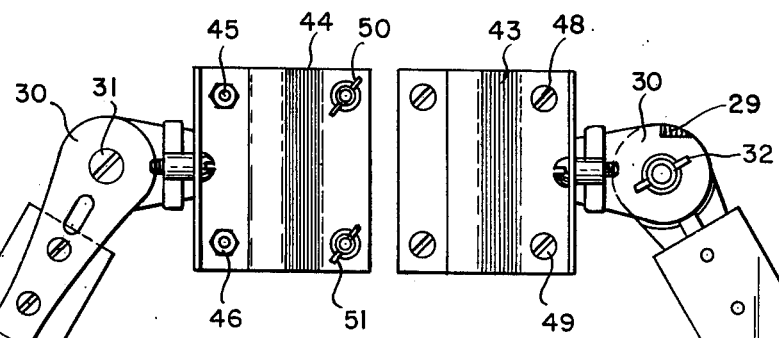
FIG. 2 is an enlarged view showing one side of a two-part clamp structure.
FIG. 3 is an enlarged view showing the opposite side of the clamp shown in FIG. 2 of the drawings.

Referring now to the drawings there is shown by reference numeral 10 in FIG. 1, a typical motorized cart such as commonly employed by golfers or the like. Such cart includes a seating area designated at 11 having back rest sections 12 and 13 and a storage area designated generally at 14. Golf bags, etc., not shown in the drawings are adapted to be placed within the storage area, in an upright position and tie means such as straps 15 are employed for retaining the bags in proper position within the storage area. The cart is usually provided with a pair of rearwardly extending horizontal bars 16 and 17 which are securely fastened in any suitable manner to a framing structure including a pair of vertically extending uprights 18 and 19. Of course, the cart is provided with the necessary motive power to propel the same as well as the supporting wheels and steering mechanism all of which is conventional for carts of this type.

Extending between the horizontal bars 16 and 17 is a transverse bar 20 constructed of metal, plastic or any suitable material. One end of the bar 20 is provided with an inturned lip 21 formed integral with or otherwise secured to the bar 20 and the opposite end of the bar is provided with a telescoping section 22 which is adapted to be slid over the said end of the bar and secured thereto by means of a threaded bolt member 23 which terminates in a hand knob 24 for manipulation in securing or releasing the telescopic section 22 to or from the transverse bar 20. The telescoping section 22 is provided with an inturned lip 25 which may be formed integral with the telescoping section 22 or secured thereto in any known manner.

Welded or otherwise secured to the transverse bar 20 is a forwardly inclined arm 26 which has fixedly mounted thereon, at the free end thereof a stationary bracket 27 which is secured to the arm 26 as by bolting the same thereto or by welding or other suitable means for fixedly securing the same thereto. The upper portion of the fixed bracket 27 is provided with a plurality of serrations 28 which cooperate with like serrations 29 which are formed on a cooperating rotatable portion 30 of a two-part bracket. A bolt 31 extends through aligned openings formed in the two-part bracket and a wing nut 32 or the like is employed for securing the bracket parts in assembled relationship. Formed integral with the rotatable part 30 of the bracket is a rearwardly extending portion 33 comprising a pair of ears 34, 35 which are internally threaded to receive bolts 36, 37 which extend through openings formed in outturned wings 38, 39 which are formed integral with the staff securing bracket indicated generally at 40 in FIGS. 4 and 5 of the drawings.

The bracket 40 comprises a pair of plates formed of suitable material, such as metal, plastic, etc., and are shown at 41 and 42 in the drawings. Formed centrally of the plates 41 and 42 are recessed areas 43 and 44 in the nature of V-formations for a purpose to be explained more fully hereinafter.

The plates 41 and 42 are held in assembled relationship by means of bolts 45, 46 which extend through aligned openings in the aforesaid plate members. A spacer 47 surrounds the bolts 45 and 46 so as to limit the amount of tightening the plates will be subjected to at that portion of the bracket. The opposite ends of the plates 41, 42 are each provided with aligned openings through which extend suitable bolt members 48, 49. Wing nuts 50, 51 or the like extend through aligned openings in the plates 41, 42 and if desired, a spacer member 52 may be interposed between the plates, again, to limit the amount of tightening of the plates.

The handle or staff of the umbrella or like canopy is adapted to be mounted in the V-shaped formations, aforesaid, in the plates and when in this position, the plates 41, 42 are tightened about the handle or staff and firmly retained therein. Since the diameter of the handles of various make umbrellas differ the particular type clamp previously described will enable the clamp to securely retain therein staffs or handles of differing diameters. Shown in FIG. 4 of the drawings is a staff or handle 53 of an umbrella which has been secured between the plates of the bracket.

Having described the various components of my invention I will now describe the manner of use and the various advantages obtained in adapting the same to motorized carts. In adapting the invention to a cart, the transverse bar 20 is first fitted onto the horizontal bars 16 and 17 and secured thereto by tightening of the bolt 23 onto the bar in the manner aforesaid. Following securing the bar onto the aforesaid horizontal bars 16 and 17, the clamp 40 is loosened to permit the insertion of the umbrella or canopy staff or handle therebetween and then the clamp plates are tightened to securely retain the same therebetween. When this has been accomplished, the angle of the umbrella rod 54 and umbrella 55 carried thereby may be varied by loosening the wing nut 32 and rotating the bracket 30 to the desired position and retightening the nut whereby the canopy or umbrella will be maintained in the desired position. Since the inclined arm 26 is centrally located on the bar 20, the same will be caused to extend in the space usually provided in the back rests 12, 13, thus offering no interference with the occupants of the cart. As can be appreciated, the canopy or umbrella supported by the rod 54 may be of various dimensions so that not only the occupants of the cart will be protected from the elements but also the articles carried in the storage area of the cart. Since the bar 20 is adjustable by reason of the telescopic section at one end thereof, the structure of the present invention may be adapted to carts wherein there is a difference in the spacing between the rearwardly extending bars aforesaid.

Thus, it will be readily appreciated that I have provided an accessory which may be quickly adapted to an open-type cart to thus provide a means for sheltering the occupants therein as well as the articles carried in the storage area.

It is submitted that the invention shown and described is aptly suited to achieve the purposes intended and is characterized by a combination of highly useful and mutually cooperating elements that combine their respective and proportionate functions in accomplishing the objects sought to be obtained.

Some changes may be made in the construction and arrangement of my umbrella supporting bracket for motorized cart without departing from the real spirit and purpose of my invention, and it is my intention to cover by my claims, and modified forms of structure or use of mechanical equivalents which may be reasonably included within their scope.

What is claimed is:

1. In combination, a canopy, a canopy supporting bracket, and a motorized cart equipped with a seating and storage area and wherein a pair of rearwardly extending horizontal bars are mounted on said cart, rearwardly of and directed away from said seating area, the improvement comprising, a forwardly inclined arm fixed to a transverse bar, one end of said bar provided with a fixed inturned lip engaging with one of said horizontal bars, the other end of said bar provided with a telescoping section having an inturned lip engaging with the other of said horizontal bars, securing said transverse bar to said rearwardly extending horizontal bars an adjustable bracket mounted on said forwardly inclined arm, said bracket including a two-part clamp engaging with the handle portion of said canopy and supporting the same in adjusted position over the seating area of said cart.

2. The structure recited in claim 1 wherein said transverse bar includes said telescoping section whereby the bar may be adjusted so as to enable the said bar to be secured to spaced apart rearwardly extending horizontal bars of differing widths.

3. The structure recited in claim 1 wherein said clamp includes a pair of plate members, each provided with a V-formation for engaging with the handle of said canopy.

4. The structure recited in claim 1 wherein said canopy is of such diameter as to extend over the seating area of said cart and the storage area of the said cart.

* * * * *